United States Patent
Chen

(10) Patent No.: US 6,671,241 B1
(45) Date of Patent: Dec. 30, 2003

(54) METHOD AND APPARATUS FOR OPTICAL AXIS ADJUSTMENT OF OPTICAL DRIVER

(75) Inventor: Yi-Chang Chen, Taipei (TW)

(73) Assignee: AsusTek Computer Inc., Taipei (TW)

( * ) Notice: Subject to any disclaimer, the term of this patent is extended or adjusted under 35 U.S.C. 154(b) by 406 days.

(21) Appl. No.: 09/709,491

(22) Filed: Nov. 13, 2000

(30) Foreign Application Priority Data

Nov. 11, 1999 (TW) ........................................ 88119803 A

(51) Int. Cl.⁷ ................................................ G11B 7/00
(52) U.S. Cl. ................................ 369/53.19; 369/47.44; 369/44.32
(58) Field of Search .......................... 369/44.32, 53.19, 369/47.44, 258, 44.35, 44.36, 47.38, 53.22, 53.3

(56) References Cited

U.S. PATENT DOCUMENTS

| | | | | |
|---|---|---|---|---|
| 5,523,989 A | * | 6/1996 | Ishibashi | 369/44.32 |
| 6,172,950 B1 | * | 1/2001 | Tanaka | 369/44.32 |
| 6,324,152 B1 | * | 11/2001 | Eguchi et al. | 369/258 |
| 6,493,296 B1 | * | 12/2002 | Fukumoto et al. | 369/44.32 |

FOREIGN PATENT DOCUMENTS

JP            10149555 A       *  6/1998

\* cited by examiner

*Primary Examiner*—Thang V. Tran
(74) *Attorney, Agent, or Firm*—Rabin & Berdo, P.C.

(57) ABSTRACT

A method for optical axis adjustment of an optical driver is provided for decreasing interference, providing a reliable sensitive determination with respect to the variation of incident angle for facilitating inspection, and precisely adjusting the incident angle to an optimum. An apparatus for optical axis adjustment of an optical driver including a spindle module for rotating disc, a plurality of adjustment devices for adjusting the oblique angle of spindle module, a read/write device for emitting an incident light signal to disc, receiving a reflected light signal from disc, and outputting a reflected voltage signal, a control circuit device for outputting a rotation control signal to the spindle module for rotating the spindle module, outputting a read/write control signal to the read/write device for emitting/receiving incident light signal, and receiving and outputting the reflected voltage signal, and a feedback device for rotating the adjustment devices in response to reflected voltage signal.

7 Claims, 7 Drawing Sheets

METHOD AND APPARATUS FOR OPTICAL AXIS ADJUSTMENT OF OPTICAL DRIVER

BACKGROUND OF THE INVENTION

1. Field of the Invention

The present invention relates to optical drivers and more particularly to a method and apparatus for optical axis adjustment of optical driver with improved characteristics.

2. Description of the Related Art

Optical drivers such as CD-ROMs have been widely used as high-capacity forms of storage. Optical drivers are indispensable in modem computers. It is known that a CD-ROM drive acts to read data from a CD-ROM for transmitting the same to a computer for processing. A conventional optical driver is shown in FIG. 1 including a spindle module 11, a read/write device 12, a control circuit device 13, and a pair of adjustment rods 14. The read/write device 12 is slidingly supported by the adjustment rods 14 such that the read/write device 12 may reciprocally move in a lengthwise direction of the adjustment rods 14. This defines a read plane. An optical storage medium (e.g., disc) 15 is rotatably supported on the spindle module 11. This defines a rotation plane. The read/write device 12 acts to continuously emit an incident light signal to the disc. Such incident light signal is then reflected by the disc to form a reflected light signal which is in turn received by the read/write device 12. Next, the reflected light signal is converted by the read/write device 12 to generate an output reflected voltage signal (a voltage signal corresponding to the reflected light signal). The traveling path of incident light signal, i.e., from the read/write device 12 to disc 15 on the rotation plane, is called an optical axis. The optical axis is required to be perpendicular to the rotation plane. That is, incident angle Q is zero. Note that incident angle Q is defined as the angle of incident light signal 21 with respect to the normal line 23 of the rotation plane 22 of the disc, as shown in FIG. 2. The control circuit device 13 acts to output a rotation control signal to the spindle module 11 for enabling spindle module 11 to rotate. The control circuit device 13 also acts to output a read/write control signal to the read/write device 12 for activating read/write device 12 to emit an incident light signal or receive the incident light signal.

Referring to FIG. 3, a plurality of adjustment devices 31 are provided on the underside of spindle module 11 for adjusting the optical axis to be perpendicular to the rotation plane. In adjusting the adjustment devices 31, the spindle module 11 is activated to slant. As such, the rotation plane of the disc is also slanted to change the incident angle to be about or equal to zero. Referring to FIG. 4, the incident angle adjustment technique of the optical driver in FIG. 1 is illustrated. The reflected light signal from the disc is received by the read/write device 12. Next, the reflected light signal is converted by the read/write device 12 to generate a reflected voltage signal. The reflected voltage signal is then sent to an error detector 41 through the control circuit device 13. A light error signal (if any) is then generated and shown. As such, an inspection person may visually adjust the light error signal by using a plurality of adjustment rods 42 to rotate the adjustment devices 31. Preferably, the value of the adjusted light error signal is a minimum. In this manner, the optical axis may be adjusted to be perpendicular to the disc. The above light error signal may be represented by means of an average standard deviation for measuring the standard deviation in the reflected voltage signals between a predetermined period of time of the signal and a standard period of time set by the error detector. The light error signal may be represented by the equation below.

$$(\text{light error signal})^2 = \frac{\sum_{i=1}^{w}(Xi - x')^2}{(n-1)}$$

where X' is a standard period of time set by the error detector and Xi is the measured value of the reflected voltage signal outputted by the read/write device 12 in the 20 predetermined period of time. For example, as X' is 3*T and then Xi is 2.8*T or 3.1 *T during a predetermined period of time equal to 3*'I'. Further, n is the number of samples and T is a predetermined period of time. However, the light error signal is not a constant. It is susceptible to interference of other factors. For example, the factors include the quality of disc, contamination, noises, and the like. As such, the variation is relatively large. This adversely affects the adjustment of optical axis. Referring to FIG. 5, a chart is shown for illustrating the variation of light error signals due to the interference of other factors versus a plurality of different incident angles. As shown, the width of curve is the amplitude of vibration of the light error signal. It is seen that the light error signal is varied significantly even when the incident angle is fixed. This not only adversely affects the adjustment of optical axis, but also prolongs the adjustment time and decreases yield. Moreover, the cost of an error detector is very high. As such, it is not economical to use the error detector as an adjustment device for adjusting the optical axis of the CD-ROM drive only.

SUMMARY OF THE INVENTION

It is an object of the present invention to provide a method for optical axis adjustment of an optical driver for decreasing the interference of other external factors and providing a reliable sensitive determination with respect to the variation of incident angle for facilitating the inspection person's observation and quickly precisely adjusting the incident angle to an optimum.

It is another object of the present invention to provide an apparatus for optical axis adjustment of an optical driver for precisely adjusting the incident angle to an optimum, thereby saving cost and increasing yield.

These and other objectives of the present invention will no doubt become obvious to those of ordinary skill in the art after having read the following detailed description of the preferred embodiment which is illustrated in the various drawings and figures.

DETAILED DESCRIPTION OF THE PREFERRED EMBODIMENT

Figure 1:
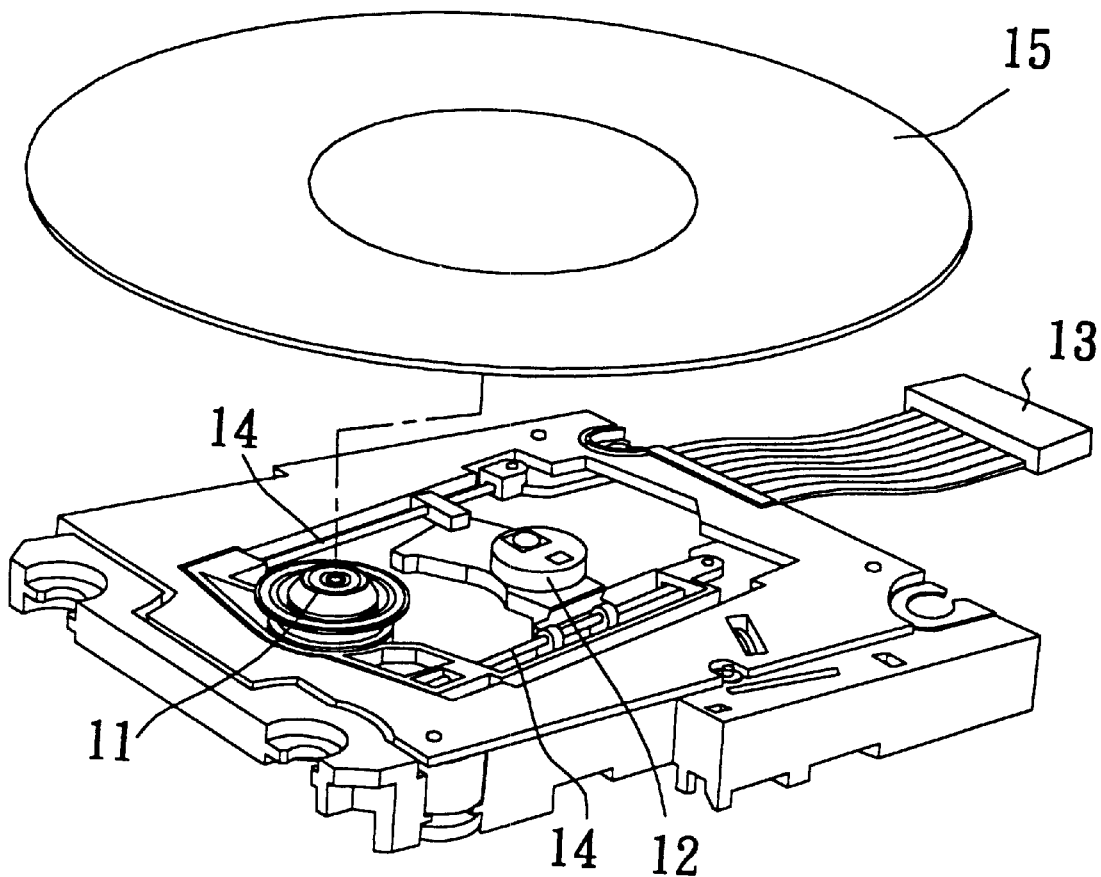
FIG. 1 is a perspective view of a conventional optical driver with disc separated.
Figure 2:
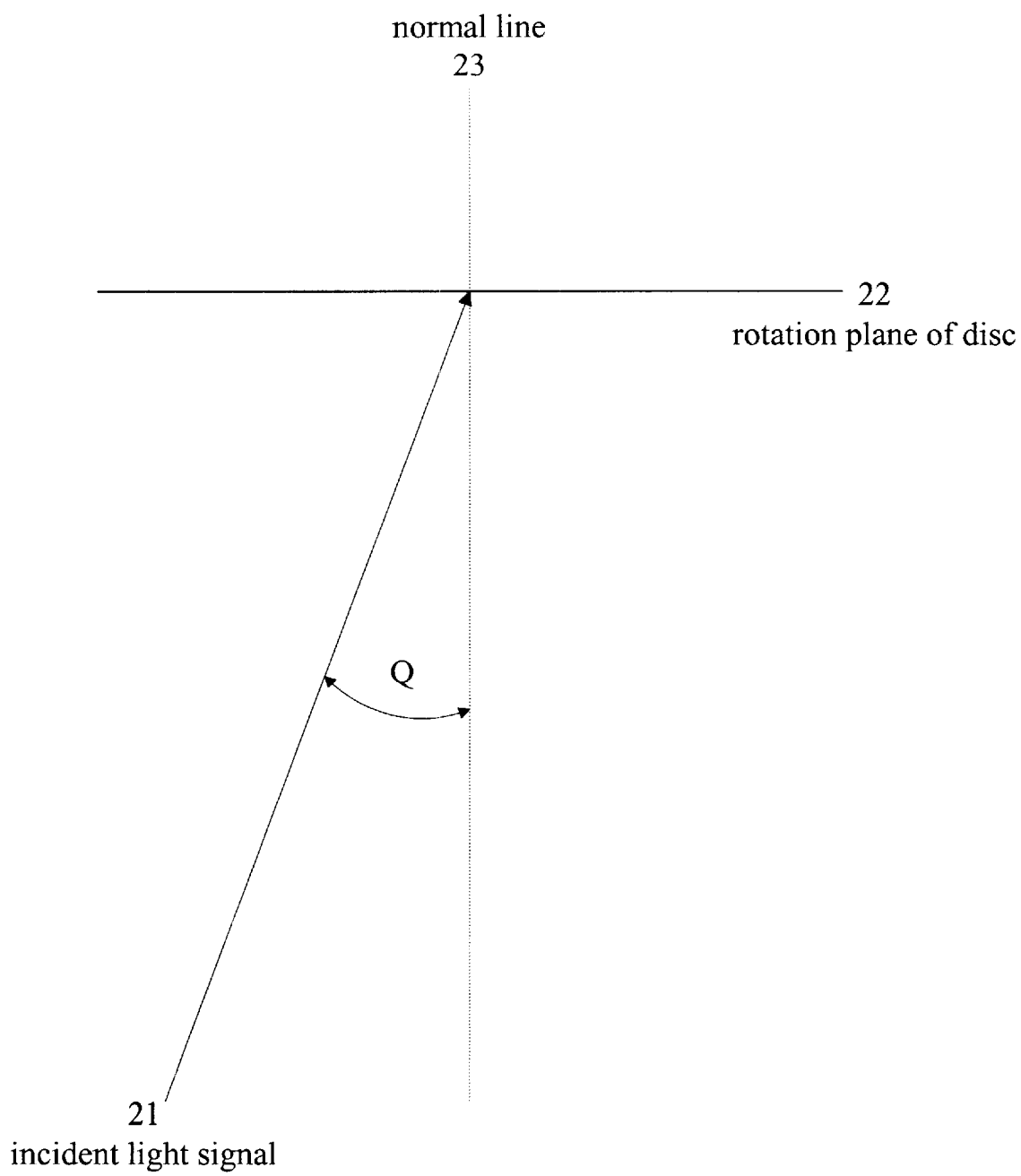
FIG. 2 is a chart depicting an incident angle between an incident light signal and the normal line of the rotation plane of disc shown in FIG. 1.
Figure 3:
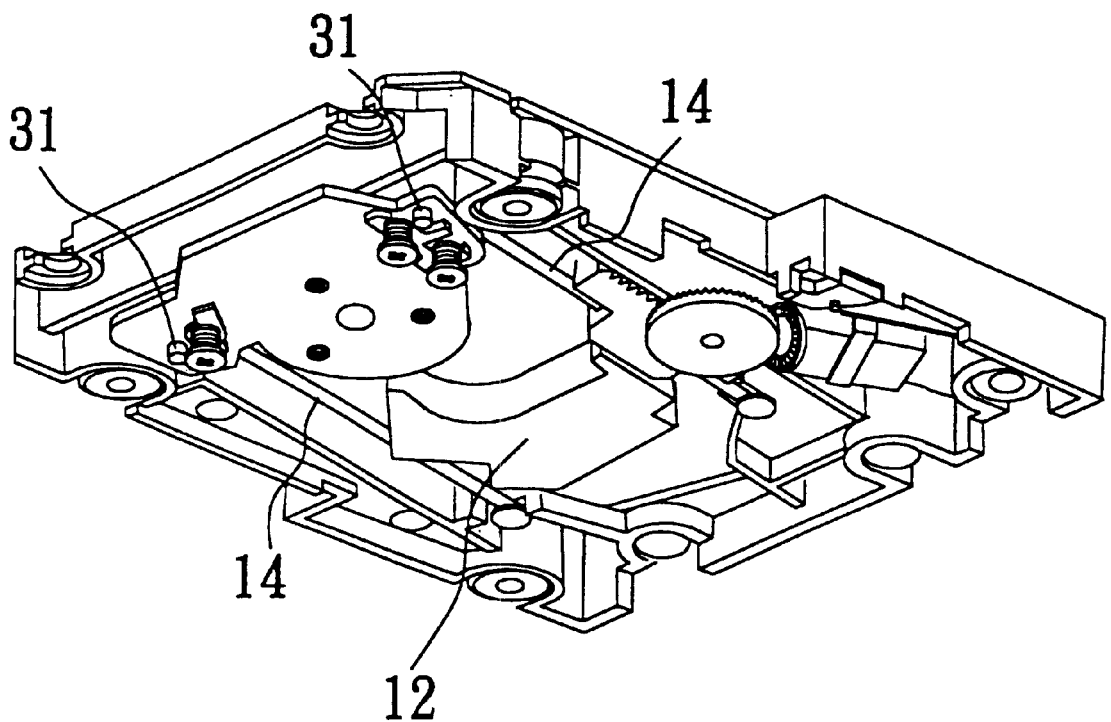
FIG. 3 is a perspective view of the underside of the FIG. 1 optical driver.
Figure 4:
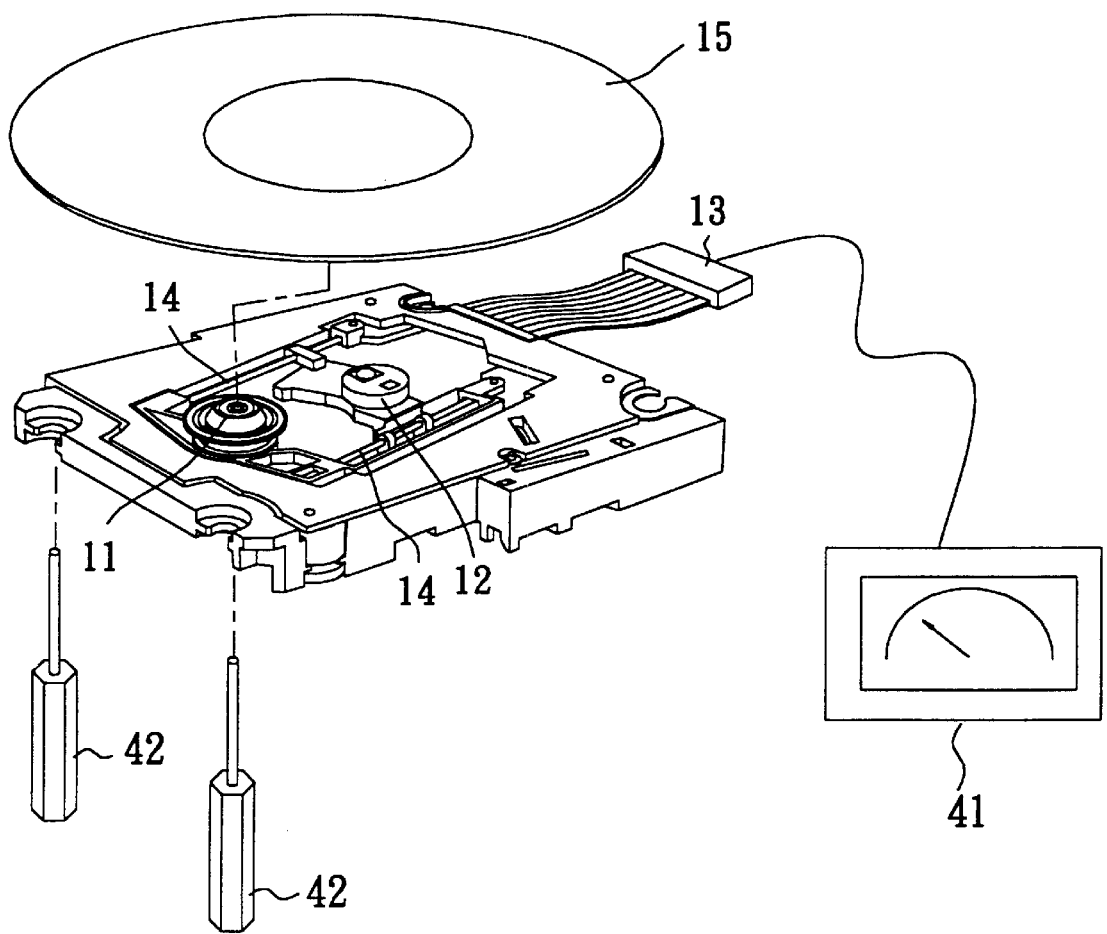
FIG. 4 schematically illustrates the adjustment of incident angle of the FIG. 1 optical driver.
Figure 5:
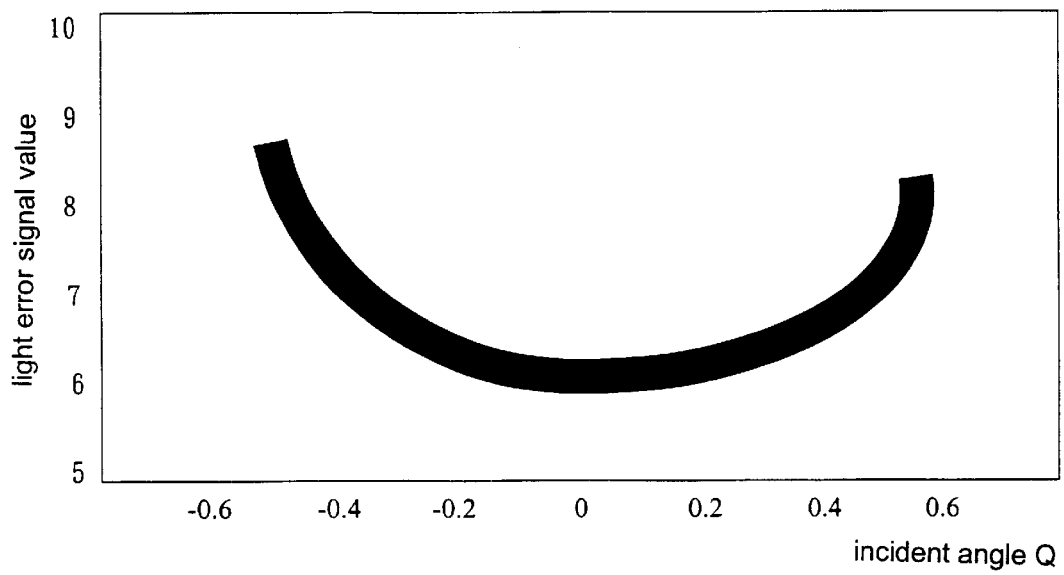
FIG. 5 is a chart illustrates the variation of light error signals employed by prior art due to the interference of other factors versus a plurality of different incident angles.
Figure 6:
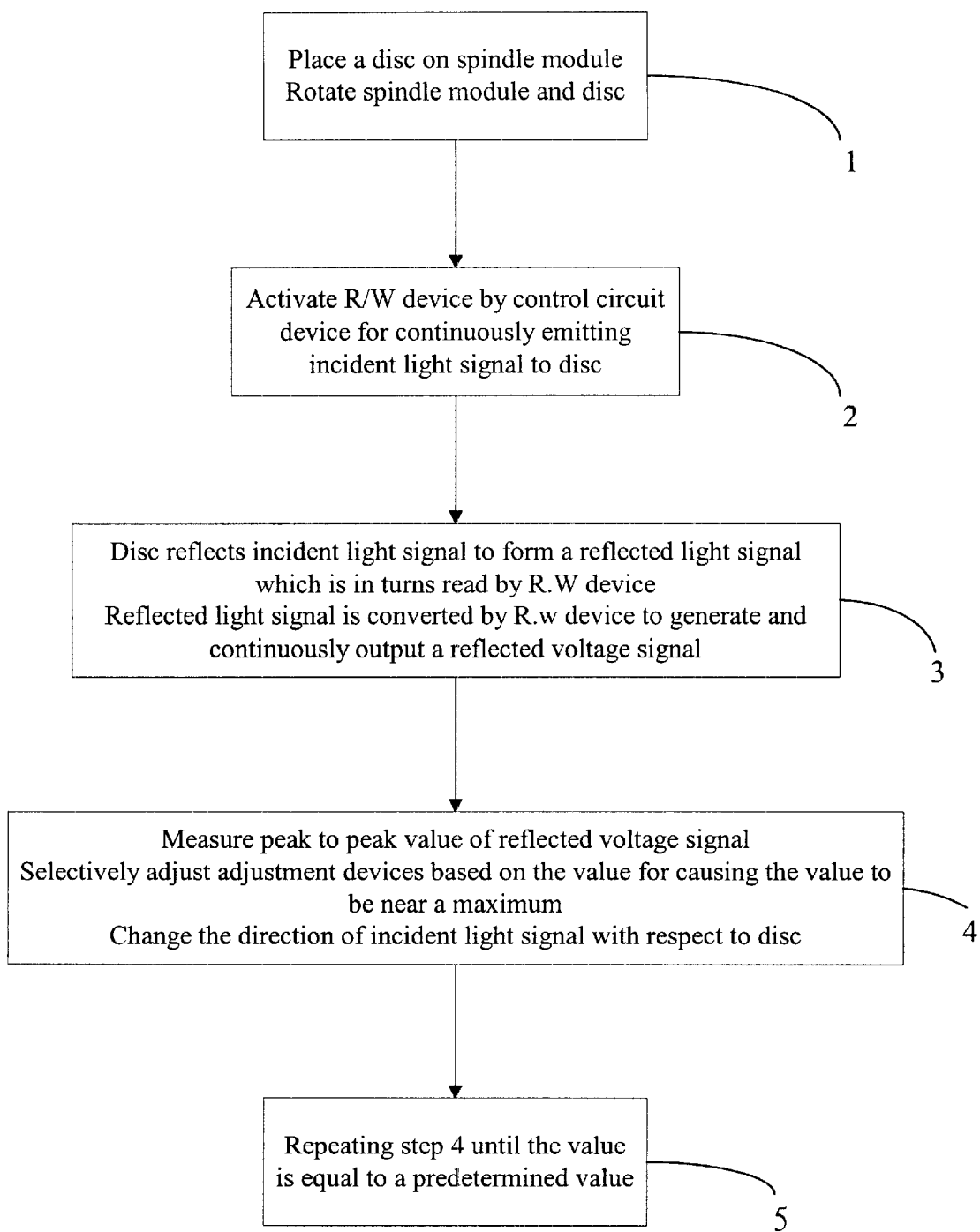
FIG. 6 is a flow chart illustrating a process for optical axis adjustment of an optical driver according to the invention.

Referring to FIG. 6, there is shown a process for optical axis adjustment of an optical driver in accordance with the invention. The variation of light error signals used for optical axis adjustment of an optical driver by the prior art is replaced by the peak to peak variation of reflected voltage signals as optical axis adjustment of optical driver in accordance with the invention. The process is detailed below in conjunction with the components of optical driver shown in FIG. 1.

In step 1, first place an optical storage medium (e.g., disc) on a spindle module of the optical driver. Then rotate the spindle module as well as the disc. A rotation plane is defined as the disc rotates. A plurality of adjustment devices are provided on the underside of spindle module for adjusting the oblique angle of the spindle module.

In step 2, a read/write device of optical driver is activated by a control circuit device of the optical driver for causing the read/write device to continuously emit an incident light signal to the disc.

In step 3, such incident light signal is then reflected by the disc to form a reflected light signal which is in turn read by the read/write device. Next, the reflected light signal is converted by the read/write device to generate and continuously output a reflected voltage signal.

In step 4, measure the peak to peak value of reflected voltage signal. Then selectively adjust the plurality of adjustment devices of the spindle module based on the measured peak to peak value so as to cause the peak to peak value of the reflected voltage signal to be near a maximum. In this manner, the direction of incident light signal with respect to the disc may be changed. That is, the direction of the optical axis is changed, or the incident angle of the adjustment rod with respect to the rotation plane of the disc is changed. As such, an inspection person may use a plurality of adjustment rods to rotate the adjustment devices for adjustment. Alternatively, a feedback device is used to automatically rotate the adjustment devices for adjustment. The feedback device acts to precisely adjust the adjustment devices for changing the direction of the optical axis in response to the reflected voltage signal and the magnitude thereof.

In step 5, repeat step 4 until the peak to peak voltage value of the reflected voltage signal is equal to a predetermined value. The predetermined value is either a maximum of peak to peak voltage value or an acceptable value proximate the maximum value.

The above process may be summarized and further described as follows. The read/write device continuously emits an incident light signal to the disc. The incident light signal is then reflected by the disc to form a reflected light signal. The reflected light signal is read by the read/write device for converting into and continuously outputting a reflected voltage signal. The shape of reflected voltage signal is sinusoidal. The intensity of reflected voltage signal is a maximum when the incident angle of incident light signal or the optical axis is 90 degrees with respect to the disc. That is, the peak to peak voltage value of the reflected voltage signal is a maximum. In contrast, the intensity of the reflected voltage signal is not a maximum when the incident angle of the incident light signal or the optical axis is not 90 degrees with respect to the disc. That is, the peak-to-peak voltage value of the reflected voltage signal is not a maximum. Further, the reduction of the intensity of the reflected voltage signal is more significant as the incident angle increases. This is because the read area of the read/write device is a constant. When the optical axis is not perpendicular to the disc, only a portion of the reflected light signal reflected by the disc is read by the read/write device. As such, only this portion of reflected light signal is converted into a reflected voltage signal by the read/write device, resulting in a reduction of the intensity of the reflected voltage signal.

Figure 7:
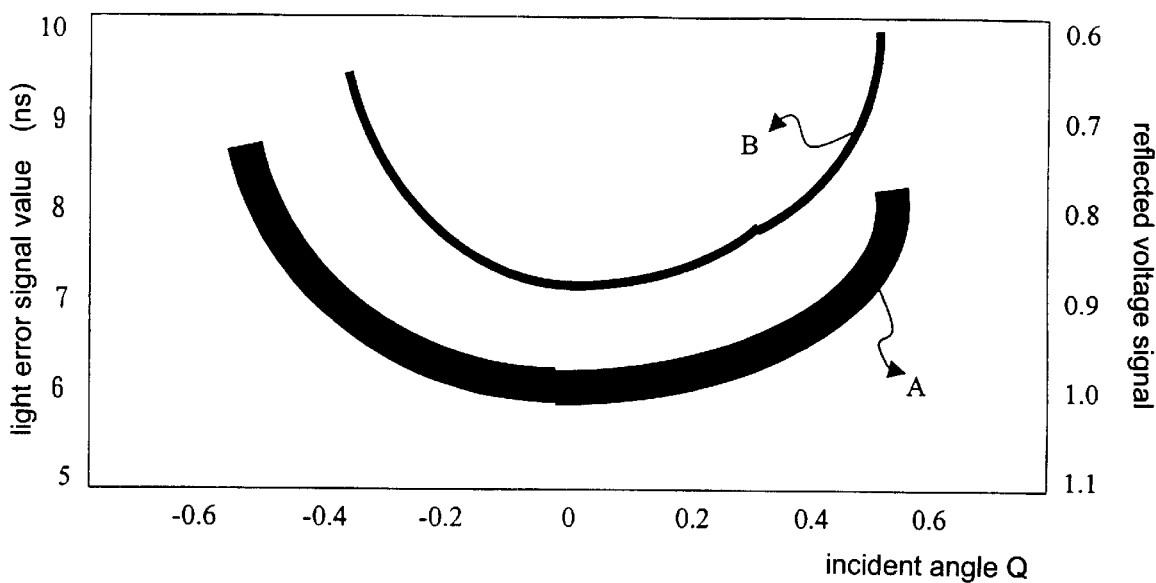
FIG. 7 is a chart illustrating the variations of reflected voltage signal of the invention and the light error signals of the conventional optical driver due to the 10 interference of other factors versus a plurality of different incident angles.

FIG. 7 is a chart illustrating the variation of reflected voltage signals (i.e., curve) B of the invention and the variation of light error signals (i.e., curve) A of the conventional optical driver due to the interference of other factors versus a plurality of different incident angles. As shown, the width of curve A is the amplitude of vibration of the light error signals due to the interference of other factors in a fixed incident angle, while the width of curve B is the amplitude of vibration of the reflected voltage signals of the invention due to the interference of other factors in the same fixed incident angle. By comparison, it is seen that the width of curve A is much larger than that of curve B. In conclusion, the technique of the invention by utilizing the reflected voltage signal to adjust the incident light signal (or the direction of the optical axis) is advantageous over that of the prior art by utilizing the light error signal to adjust the incident light signal. That is, the former is less adversely affected by other factors such as the quality of disc, contamination, noises, or the like. For example, a small variation of incident angle (e.g., from 0.25 to−0.25) corresponds to a still significant change of reflected voltage signal. Hence, the invention is more sensitive to variation of incident angle, thereby precise adjustment of the incident angle to an optimum.

Figure 8:
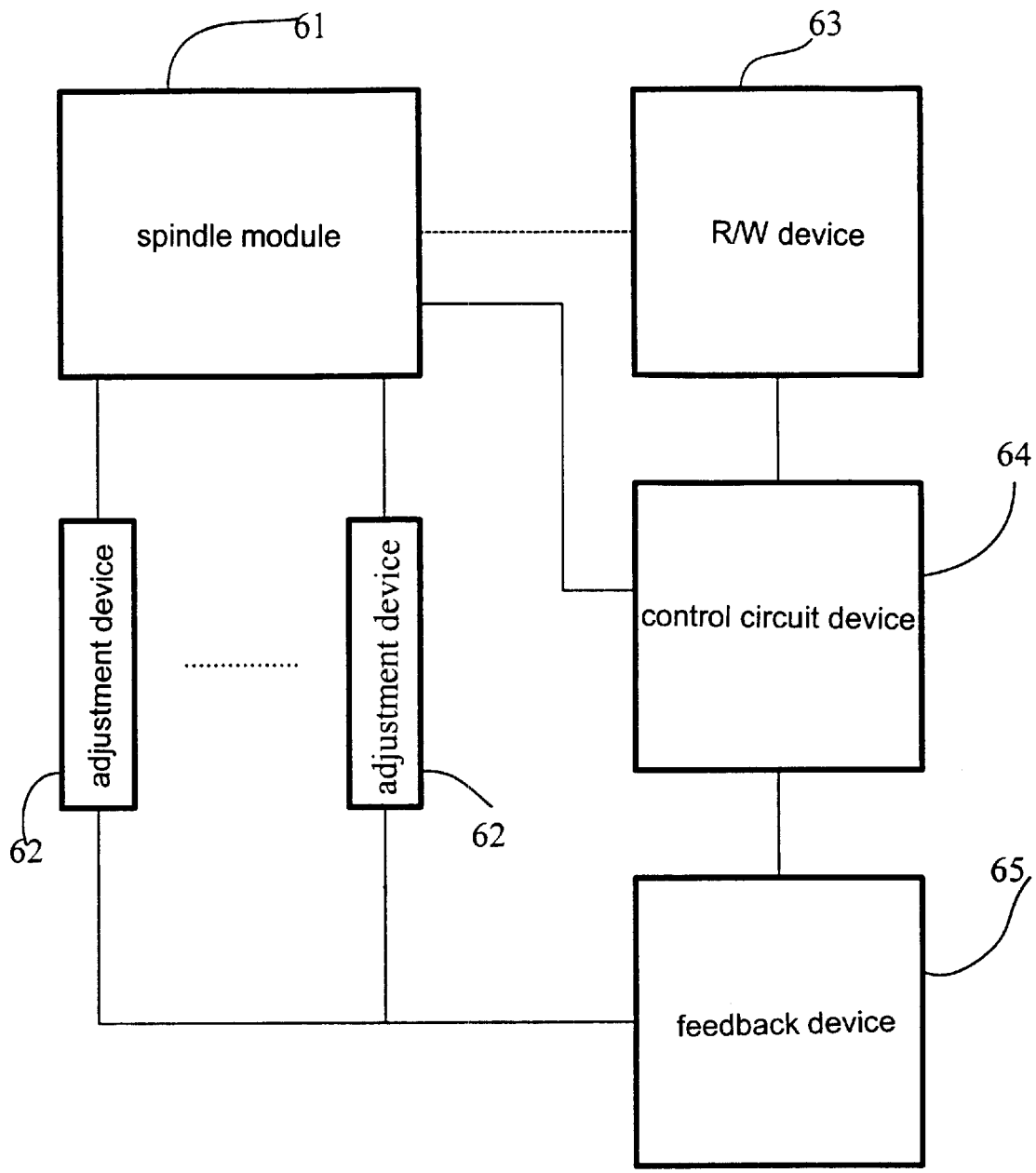
FIG. 8 is a block diagram illustrating the components of an apparatus for optical axis adjustment of an optical driver according to the invention.

FIG. 8 is a block diagram illustrating the components of an apparatus for optical axis adjustment of an optical driver of the invention. The apparatus comprises a spindle module 61 for supporting and rotating a disc, a plurality of adjustment devices 62 attached to the bottom of spindle module 61 for adjusting the oblique angle of spindle module 61, a read/write device 63 for emitting an incident light signal to the disc, receiving a reflected light signal reflected by the disc, and outputting a reflected voltage signal generated therein, a control circuit device 64 for outputting a rotation control signal to spindle module 61 for enabling spindle module 61 to rotate, outputting a read/write control signal to read/write device 63 for activating read/write device 63 to emit the incident light signal or receive the incident light signal, and receiving and outputting the reflected voltage signal, and a feedback device 65 for rotating the adjustment devices in response to reflected voltage signal outputted from control circuit device 64.

The operation of the apparatus of the invention will now be described in detail below. When a disc is placed on the spindle module 61, the control circuit device 64 outputs a rotation control signal to the spindle module 61 for rotating the disc. Then, the control circuit device 64 outputs a read/write control signal to the read/write device 63 for activating the read/write device 63 to emit an incident light signal to the disc. Next, a reflected light signal reflected by the disc is received by the read/write device 63. In turn, the read/write device 63 outputs a reflected voltage signal generated therein to the control circuit device 64. Then, the control circuit device 64 outputs the reflected voltage signal to the feedback device 65. After the reflected voltage signal is received by the feedback device 65, the feedback device 65 selectively rotates the adjustment devices 62 based on the magnitude of the reflected voltage signal. As stated above, the adjustment devices 62 are located at the bottom of the spindle module 61. As such, it is possible to adjust the oblique angle of the spindle module 61 by rotating the adjustment devices 62.

Note that the expensive error detector employed by the prior art is eliminated by the invention, resulting in a reduction in the manufacturing cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for optical axis adjustment of an optical driver with respect to an optical storage medium, the optical driver including a spindle module and a plurality of adjustment means for adjusting an oblique angle of the spindle module, the optical driver being capable of continuously emitting an incident light signal and continuously emitting a reflected voltage signal, the method comprising the steps of:

(a) measuring a peak to peak voltage value of the reflected voltage signal;

(b) selectively adjusting the adjustment means based on the measured peak to peak voltage value of the reflected voltage signal, thereby changing the direction of the incident light signal with respect to the optical storage medium; and repeating the steps (a) and (b) until the peak to peak voltage value of the reflected voltage signal is equal to a predetermined value.

2. The method of claim 1, wherein the step (b) comprises manually rotating a plurality of adjustment rods for adjusting.

3. The method of claim 1, wherein the step (b) comprises automatically rotating the adjustment means by a feedback means in response to the measured peak to peak voltage value of the reflected voltage signal.

4. A method for optical axis adjustment of an optical driver with respect to an optical storage medium, the optical driver including a spindle module and a plurality of adjustment means for adjusting an oblique angle of the spindle module, the method comprising the steps of:

(i) continuously emitting an incident light signal from the optical driver so as to be reflected from optical storage means back to the optical driver;

(ii) continuously emitting from the optical driver in a voltage signal corresponding to the reflected light signal;

(iii) measuring a value of the peak to peak voltage of the voltage signal;

(iv) automatically selectively adjusting the adjustment means based on and in response to the measured peak to peak voltage value, thereby changing the direction of the incident light signal with respect to the optical storage medium according to the value of the peak to peak voltage; and (v) repeating the steps (iii) and (iv) until the value of the peak to peak voltage is equal to a predetermined value.

5. The method of claim 4, wherein the step (iv) includes rotating the adjustment means by a feedback means automatically in response to the measured peak to peak voltage value of the reflected voltage signal.

6. An apparatus for optical axis adjustment of an optical driver, comprising:

a spindle module for supporting and rotating an optical storage medium;

a plurality of adjustment means on the bottom of the spindle module for adjusting an oblique angle of the spindle module;

read/write means for emitting an incident light signal to the optical storage medium, receiving a reflected light signal reflected by the optical storage medium, and generating and outputting a voltage signal corresponding to the reflected light signal;

control circuit means for outputting a rotation control signal to the spindle module for rotating the spindle module, outputting a read/write control signal to the read/write means for activating the read/write means to emit the incident light signal or receive the incident light signal, and receiving and outputting the voltage signal; and feedback means, responsive to the voltage signal outputted from the control circuit means, for rotating the adjustment means.

7. The apparatus of claim 6, wherein the voltage signal outputted from the control circuit means is a peak-to-peak voltage value thereof.

* * * * *